US008010109B2

(12) United States Patent
Voyer et al.

(10) Patent No.: US 8,010,109 B2
(45) Date of Patent: Aug. 30, 2011

(54) CALL ROUTING DETERMINATION BASED ON A CLASS OF SERVICE ASSOCIATED WITH THE CALL

(75) Inventors: Nicolas Voyer, Rennes Cedex (FR); Herve Bonneville, Rennes Cedex (FR)

(73) Assignee: Mitsubishi Electric Corporation, Tokyo (JP)

( * ) Notice: Subject to any disclaimer, the term of this patent is extended or adjusted under 35 U.S.C. 154(b) by 866 days.

(21) Appl. No.: 12/014,504

(22) Filed: Jan. 15, 2008

(65) Prior Publication Data

US 2008/0176570 A1 Jul. 24, 2008

(30) Foreign Application Priority Data

Jan. 18, 2007 (EP) .................................. 07000994

(51) Int. Cl.
*H04W 36/00* (2009.01)
*H04W 4/00* (2009.01)
(52) U.S. Cl. ...................... 455/436; 455/426.1; 455/439
(58) Field of Classification Search ........................ None
See application file for complete search history.

(56) References Cited

U.S. PATENT DOCUMENTS

| 5,410,740 A * | 4/1995 | Hagstrom .................. 455/67.11 |
| 2001/0039197 A1 | 11/2001 | Barkan |
| 2002/0107021 A1 * | 8/2002 | Ishikawa et al. .............. 455/436 |
| 2002/0119776 A1 * | 8/2002 | Vestergaard et al. ......... 455/436 |
| 2005/0159107 A1 * | 7/2005 | Mauney et al. .............. 455/41.2 |

FOREIGN PATENT DOCUMENTS

| WO | WO 94/22239 | 9/1994 |
| WO | WO 96/35309 | 11/1996 |

* cited by examiner

*Primary Examiner* — Erika A Gary
(74) *Attorney, Agent, or Firm* — Oblon, Spivak, McClelland, Maier & Neustadt, L.L.P.

(57) ABSTRACT

A method for determining if a call, corresponding to a mobile terminal located in a cell of a base station of a wireless telecommunication network is permitted to be routed through the base station. The method includes receiving a command representative of a level of acceptance of calls permitted to be routed through the base station, obtaining a class of service associated with the call, and deciding if the call is permitted to be routed through the base station according to the class of service of the call and the level of acceptance of calls permitted to be routed through the base station.

18 Claims, 5 Drawing Sheets

CALL ROUTING DETERMINATION BASED ON A CLASS OF SERVICE ASSOCIATED WITH THE CALL

CROSS-REFERENCE TO RELATED APPLICATIONS

This application is based upon and claims the benefit of priority under 35 U.S.C. §119 from European Patent Application No. 07000994.9, filed Jan. 18, 2007, the entire contents of which is incorporated herein by reference.

BACKGROUND OF THE INVENTION

1. Field of the Invention

The present invention relates to methods and devices for determining if a call, in which a mobile terminal located in a cell of a base station of a wireless telecommunication network is involved, has to go through the base station.

2. Description of Related Art

Today, there is a trend to put base stations of inside home and offices. Recently, some Fixed-Mobile Convergence (FMC) solutions are proposed, where Public Land Mobile Network (PLMN) signals are relayed inside homes/offices.

However, the only customers to which an access can be offered to the cells of these base stations are the one being the owner of the base station.

If the owner of the base station authorizes calls from other mobile terminals to go through its base station, it may occur sometimes that these calls require most of the resources of the base station. In such case, the owner may not be able to establish or receive a communication through its own base station.

Furthermore, if the owner of the base station unplugs its base station, this will affect the communication of its mobile terminal and other mobile terminals.

This situation is not satisfactory.

BRIEF SUMMARY OF THE INVENTION

The aim of the invention is therefore to propose methods and devices which make it possible to enable to limit the use of the resources of a base station for the transfer of communication through the base station.

To that end, the present invention concerns a method for determining if a call, in which a mobile terminal located in a cell of a base station of a wireless telecommunication network is involved, has to go through the base station, characterised in that the method comprises the steps of:
receiving a command representative of a level of acceptance of calls going through the base station,
obtaining a class of service associated to the call,
deciding if the call has to go through the base station according to the class of service of the call and the level of acceptance of calls going through the base station.

The present invention concerns also a device for determining if a call, in which a mobile terminal located in a cell of a base station of a wireless telecommunication network is involved, has to go through the base station, characterised in that the device comprises:
means for receiving a command representative of a level of acceptance of calls going through the base station,
means for obtaining a class of service associated to the call,
means for deciding if the call has to go through the base station according to the class of service of the call and the level of acceptance of calls going through the base station.

Thus, the use of the resources of a base station for the transfer of communication through the base station can be restricted, according to the level of acceptance of calls.

Furthermore, the level of acceptance can be varied so as to adapt the restriction of access to various usages of the base station. The resources of the base station can be reserved for prioritised calls, having the appropriate class of service.

According to a particular feature, the method is executed by the base station or the device is the base station and the command representative of a level of acceptance is received from a keyboard associated to the base station.

Thus, the control of the use of the resources of a base station is not centralized and doesn't need an important transfer of data through the telecommunication network. It is easy to adapt, in real time, the restrictions when the usage of the base station varies.

According to a particular feature, the call is an ongoing call going through the base station or a new call in which the mobile terminal is involved, or is an ongoing call going through another base station of the wireless telecommunication network and for which a handover procedure is requested in order to allow the ongoing call to go through the base station.

Thus, the restriction of access can apply both to ongoing and new calls. It is not necessary to wait for the end of ongoing calls to get free resource when the level of acceptance of calls is changed according to the invention.

According to a particular feature, the base station establishes an handover procedure with another base station for one ongoing call going through the base station if the class of service of the ongoing call is not compatible with the level of acceptance of calls going through the base station.

Thus, each ongoing call going through the base station having a class of service which is not compatible with the level of acceptance of calls going through the base station can continue the communication through another base station. There is no interruption of the communication. The resource of the base station previously used for such ongoing calls can be reassigned to other ongoing calls or new calls with a class of service that is compatible with the level of acceptance of calls.

Such case is particularly effective when the owner of the base station authorizes calls from other mobile terminals to go through its base station. The owner of the base station can restrict the usage of its base station for the usage of the sole mobile terminals which are also owned by the owner of the base station. The quality of the communication of the mobile terminals of the owner of the base station can be enhanced.

According to a particular feature, the command representative of a level of acceptance of calls going through the base station is a power off command of the base station.

Thus, even if the base station is powered off, each ongoing call going through the base station can continue the communication. There is no interruption of the communication. It is easy for the owner of the base station to achieve basic handling of the base station, such as switching off the base station. The communications of tiers mobile terminals, going through the base station prior to the switching off, can be maintained after the switch off.

According to a particular feature, the base station is powered off once an handover has been executed for each ongoing call going through the base station or after a timer duration.

Thus, an important number of ongoing calls going through the base station can continue the communication. Furthermore, the owner of the base station needs not wait an undefined time, when it is necessary to manually power off the base station.

The present invention concerns also a method for enabling the determination if a call, in which a mobile terminal located in a cell of a base station of a wireless telecommunication network is involved, has to go through the base station, characterised in that the method comprises the steps of executed by a server of the wireless telecommunication network:

determining a class of service associated to the call, transferring the determined class of service associated to the call to the base station.

The present invention concerns also a server of the wireless telecommunication network enabling the determination if a call, in which a mobile terminal located in a cell of a base station of the wireless telecommunication network is involved, has to go through the base station, characterised in that the server comprises:

means for determining a class of service associated to the call, means for transferring the determined class of service associated to the call to the base station.

Thus, the use of the resources of a base station for the transfer of communication through a base station can be restricted and defined for each call.

According to a particular feature, the class of service is determined from the call priority and/or according to the type of service associated to the call.

Thus, by prioritizing the calls, the selection of the calls which can go through the base station is very effective.

According to a particular feature, the class of service is determined considering if the mobile terminal involved in the call belongs to the owner of the base station which is handling the call or if the mobile terminal involved in the call is registered as a preferred mobile terminal for the base station.

Thus, the mobile terminal which belongs to the owner of the base station which is handling the call has some higher priority in comparison with other mobile terminals. The owner of the base station can optimise the usage of its base station.

Furthermore, it can be set some preferred mobile terminals for a base station. These mobile terminals have some priority in comparison with other mobile terminals.

According to a particular feature, the class of service is determined according to the subscription level of the mobile terminal to the wireless telecommunication operator.

Thus, the mobile terminals which have a high subscription level have some priority in comparison with other mobile terminals.

According to a particular feature, the class of service is determined considering if the mobile terminal involved in the call belongs to the owner of the base station which is handling the call and according to the number and/or the class of service of calls abruptly terminated due to at least one power off of the base station and/or according to the number and the class of service of calls abruptly terminated due to at least one power off of at least one different base station, the at least one different base station belonging to the owner of the base station.

Thus, if the mobile terminal involved in the call belongs to the owner of a base station, the class of service is adjusted according to the contribution by the base stations belonging to the owner for the wireless telecommunication network.

According to a particular feature, the class of service is determined considering the level of acceptance of calls of at least one base station BTS belonging to the owner of the mobile terminal.

Thus, it is possible to encourage owners of base stations to set high level of acceptance of calls going through the base stations. The access to the telecommunication network through these base stations is more likely to be opened to mobile terminals not owned by the owner of the base stations. The coverage of the telecommunication is likely to be enhanced.

According to a particular feature, the server determines a financial compensation for the base station according to the level of acceptance of calls going through the base station.

Thus, it is possible to encourage owners of base stations to set high level of acceptance of calls going through the base stations. The access to the telecommunication network through these base stations is more likely to be opened to mobile terminals not owned by the owner of the base stations. The coverage of the telecommunication is likely to be enhanced.

According to a particular feature, the server determines a billing formula for the calls of a mobile terminal according to the determined class of service and/or at least one level of acceptance of calls going through a base station owned by the owner of the mobile terminal.

Thus, it is possible to encourage owners of base stations to set high level of acceptance of calls going through the base stations. The access to the telecommunication network through these base stations is more likely to be opened to mobile terminals not owned by the owner of the base stations. The coverage of the telecommunication is likely to be enhanced.

According to still another aspect, the present invention concerns computer programs which can be directly loadable into a programmable device, comprising instructions or portions of code for implementing the steps of the methods according to the invention, when said computer programs are executed on a programmable device.

Since the features and advantages relating to the computer programs are the same as those set out above related to the methods and devices according to the invention, they will not be repeated here.

BRIEF DESCRIPTION OF THE DRAWINGS

The characteristics of the invention will emerge more clearly from a reading of the following description of an example embodiment, the said description being produced with reference to the accompanying drawings, among which.

DETAILED DESCRIPTION

Figure 1:
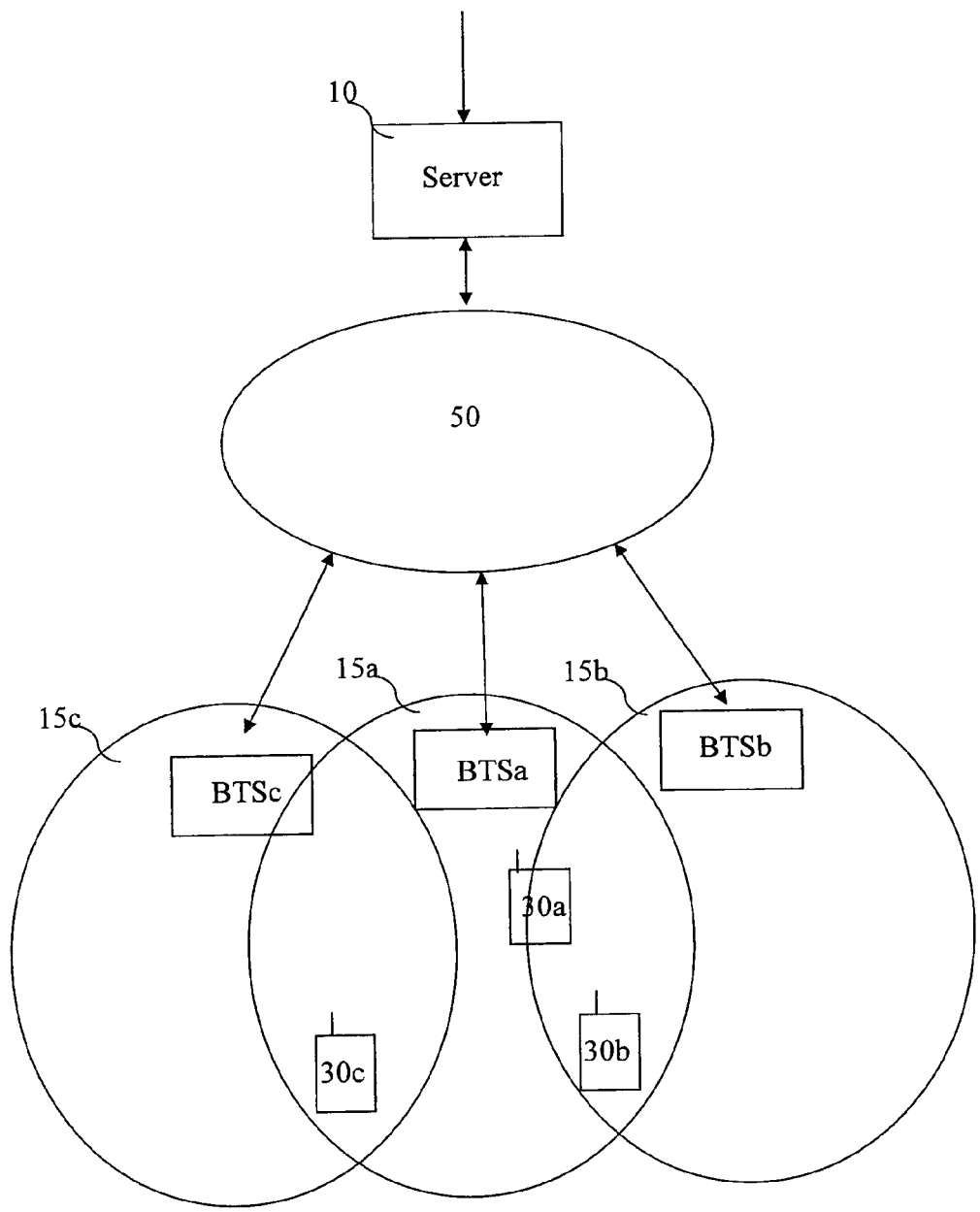
FIG. 1 is a diagram representing the architecture of a wireless telecommunication network in which the present invention is implemented.

FIG. 1 is a diagram representing the architecture of a wireless telecommunication network in which the present invention is implemented.

In the wireless telecommunication network according to the present invention, plural base stations BTSa, BTSb and BTSc, manage respectively the cells 15a, 15b and 15c in which mobile terminals 30a, 30b and 30c are located. The base stations BTS are linked through a telecommunication network 50 to a server 10.

The telecommunication network 50 is, as example and in a non limitative way, a dedicated wired network, part of public network like a public switched network, an IP based network, a wireless network, an Asynchronous Transfer Mode network or a combination of above cited networks.

The server 10 is classically named a Mobility Management Entity or a Serving GPRS Support Node or a Foreign Agent or a Visitor Location Register or a Public Land Mobility Network server.

The server 10 comprises means for authenticating each mobile terminal 30 which intends to establish a communication through the wireless telecommunication network, means for memorizing the location of each mobile terminal 30 within the wireless telecommunication network and means for determining a class of service for each call transferred through the wireless telecommunication network to each mobile terminal 30 or received through the wireless telecommunication network by each mobile terminal 30.

Only one server 10 is shown in the FIG. 1 for the sake of clarity but in practice, a more important number of server 10 are comprised in the wireless telecommunication network.

The base stations BTSa, BTSb and BTSc comprise means for enabling the establishment or the continuation of a communication with each mobile terminal 30 which is located in the respective cells 15a, 15b and 15c each base station BTSa, BTSb and BTSc manages.

The base stations BTS are also named a node or a node B or an enhanced node B or an access point.

Only three base stations BTSa, BTSb and BTSc are shown in the FIG. 1 for the sake of clarity. The base station BTSa manages the cell 15a, the base station BTSb manages the cell 15b and the base station BTSc manages the cell 15c.

According to the invention, each base station BTS comprises means for limiting the access by the mobile terminals 30 to the wireless telecommunication network according to the class of service determined by the server 10 for each call transferred through the wireless telecommunication network to each mobile terminal 30 located in the cell of the base station BTS or received through the wireless telecommunication network by each mobile terminal 30 located in the cell of the base station BTS.

The base stations BTS are as example preferably located in homes or offices.

The base stations BTS belong to partners of the wireless telecommunication network. As example, the base station BTSa belongs to a first partner Pa and the base stations BTSc and BTSb belong to a second partner Pcb.

A partner of the wireless telecommunication network is a company or a person which authorizes the mobile terminals 30 which are located in the cell 15 of its base station or base stations BTS to establish calls through one of its base station BTS and through the telecommunication network 50.

In return of such service, the partner of which the base station BTS which is used by a mobile terminal 30 for the establishment or the continuation of a communication, preferably receives a financial compensation from the wireless telecommunication network operator. The financial compensation can be a discount on the subscription fee for the base station BTS, or a discount for communications with mobile terminals 30 owned by the partner, or a discount for subscription of access to the telecommunication network 50 or a payment.

The financial compensation is as example proportional to the amount of communications established or continued through the base station BTS, or proportional to the number of bits transferred by the base station BTS for the communication.

The mobile terminals 30 are terminals like mobile phones, personal digital assistants, or personal computers. The mobile terminals 30 can be either the mobile terminals of a partner of the wireless telecommunication network, or mobile terminals owned by clients of the wireless telecommunication network.

A client of the wireless telecommunication network is a person which subscribed to the wireless telecommunication network operator, the access to the wireless cellular telecommunication network comprising the base stations BTS according to the present invention. A client of the wireless telecommunication network is not necessary a partner of the wireless telecommunication network.

Only three mobile terminals 30a, 30b and 30c are shown in the FIG. 1 for the sake of clarity but in practice, a more important number of mobile terminals 30 are located in the cells 15 of the wireless telecommunication network.

Figure 2:
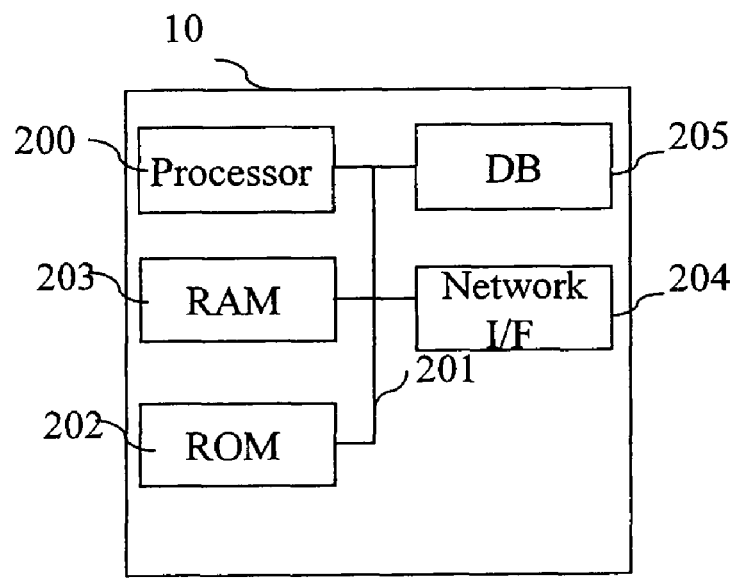
FIG. 2 is a block diagram of a server according to the present invention.

FIG. 2 is a block diagram of a server according to the present invention.

Figure 5:
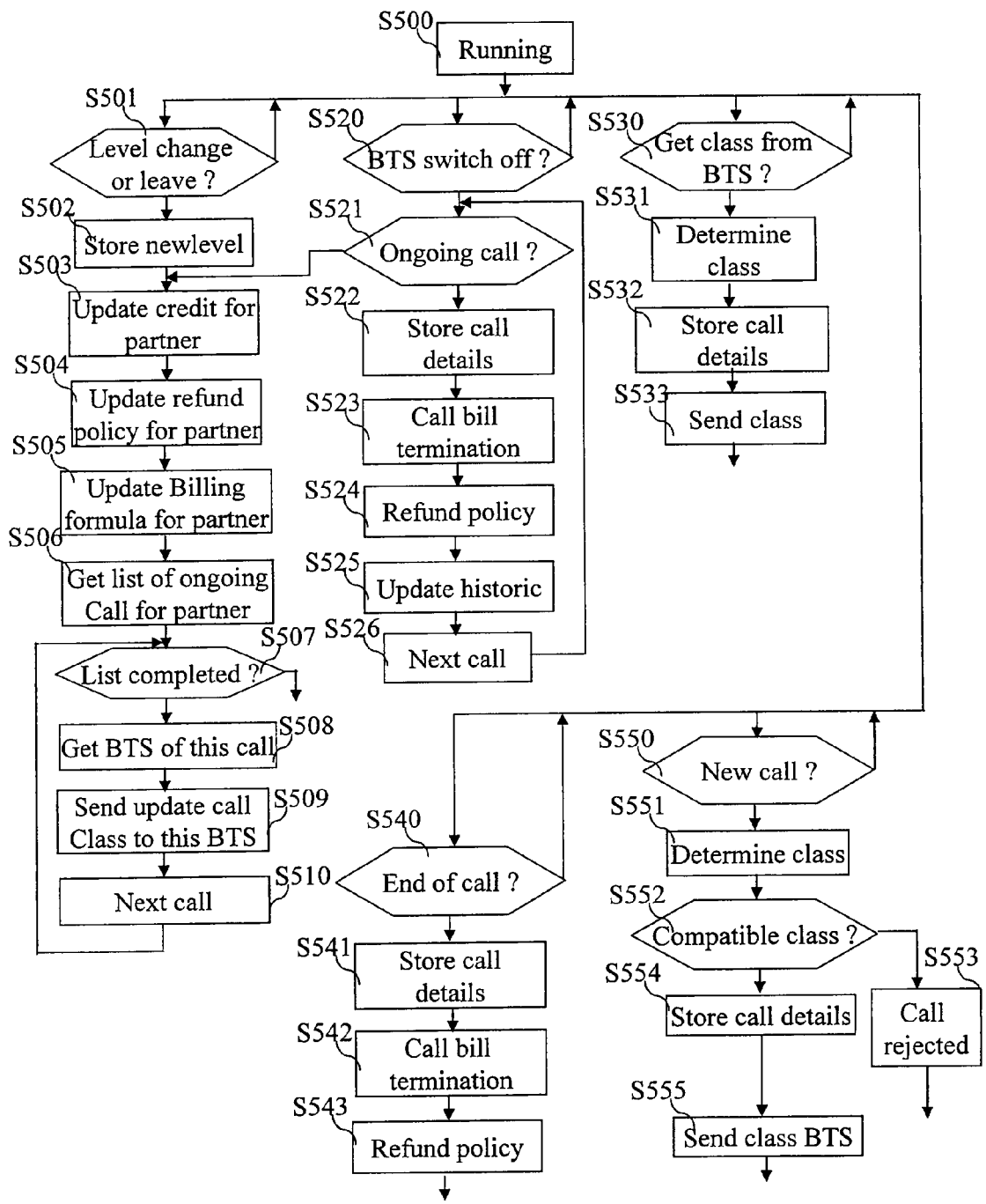
FIG. 5 represents an algorithm executed by a server according to the present invention.

The server 10 has, for example, an architecture based on components connected together by a bus 201 and a processor 200 controlled by the programs as disclosed in the FIG. 5.

It has to be noted here that the server 10 is, in a variant, implemented under the form of one or several dedicated integrated circuits which execute the same operations as the one executed by the processor 200 as disclosed hereinafter.

The bus 201 links the processor 200 to a read only memory ROM 202, a random access memory RAM 203, a database 205 and a network interface 204.

The RAM memory 203 contains registers intended to receive variables, and the instructions of the programs related to the algorithm as disclosed in the FIG. 5.

The read only memory 202 contains the instructions of the programs implementing the algorithm of the FIG. 5.

The processor 200 controls the operation of the network interface 204.

The server 10 is connected to the telecommunication network 50 through the network interface 204. As example, the network interface 204 is a DSL (Digital Subscriber Line) modem, or an ISDN (Integrated Services Digital Network) interface, etc.

The database 205 memorises, for each mobile terminal 30 comprised in the cells of the wireless telecommunication network, information related to the mobile terminal 30 like authentication parameters, subscription parameters, the identifier of the area in which the mobile terminal 30 is supposed to be located, information indicating if the mobile terminal 30 is a mobile terminal of a partner, if the mobile terminal 30 is associated to at least one community of base stations BTS.

Figure 3:
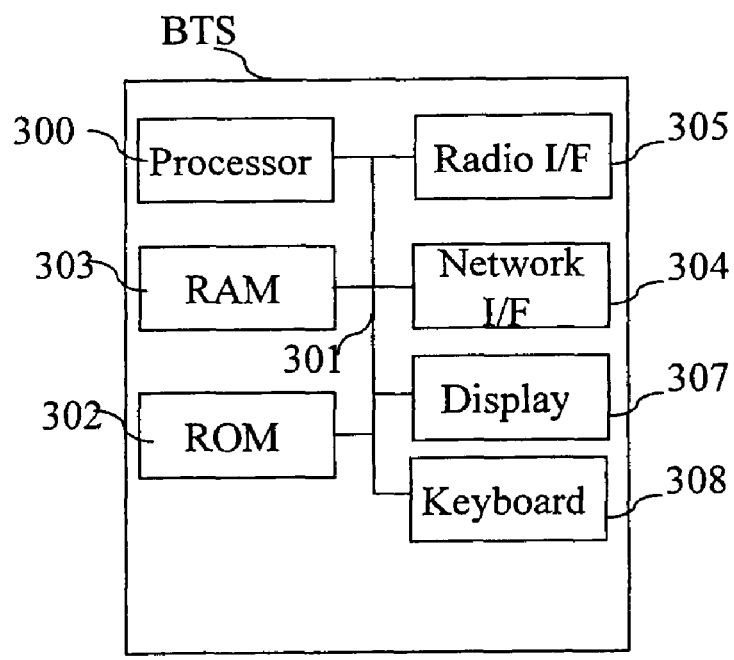
FIG. 3 is a block diagram of a base station according to the present invention.

FIG. 3 is a block diagram of a base station according to the present invention.

Figure 4A:
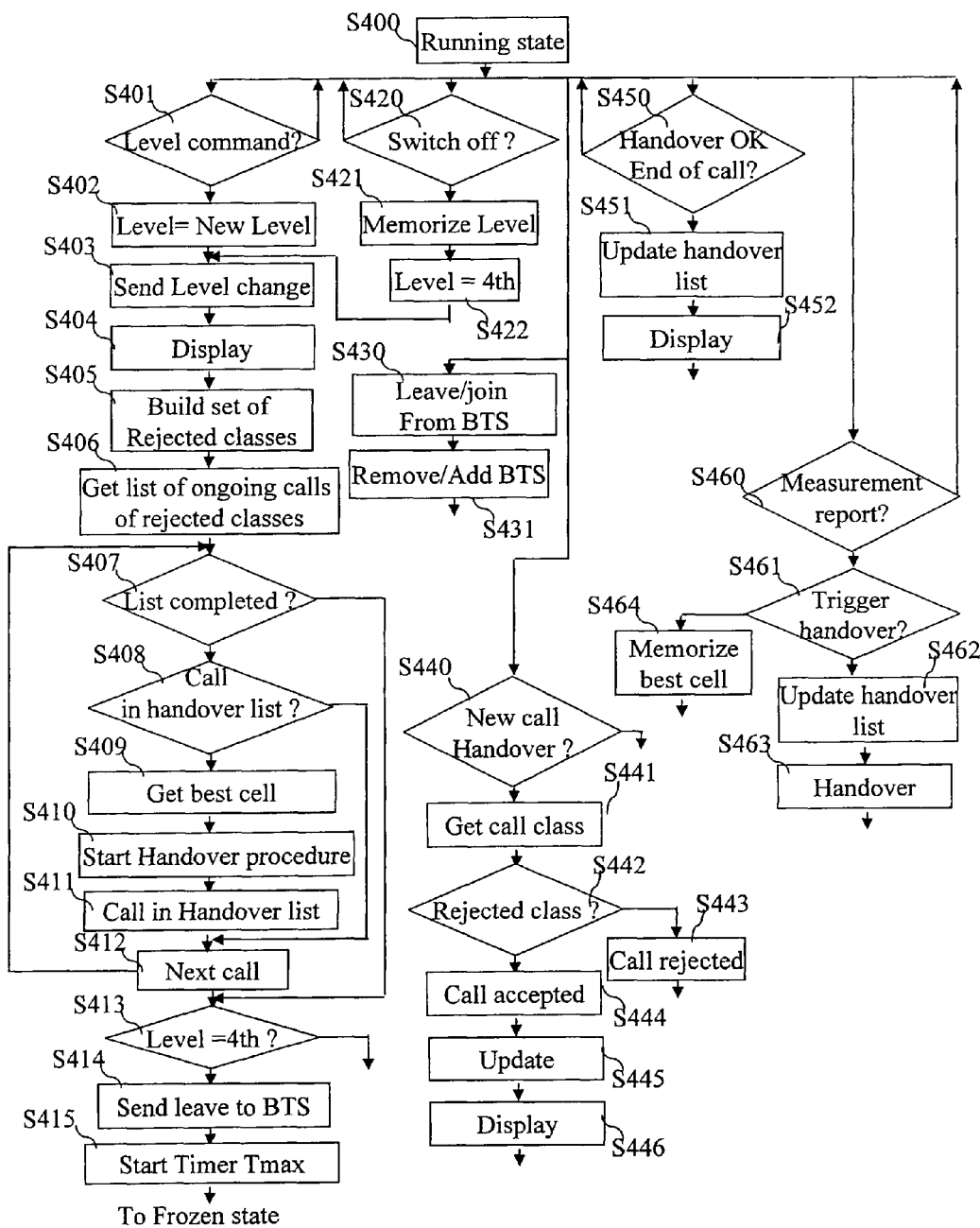
FIGS. 4a and 4b represent an algorithm executed by a base station according to the present invention.
Figure 4B:
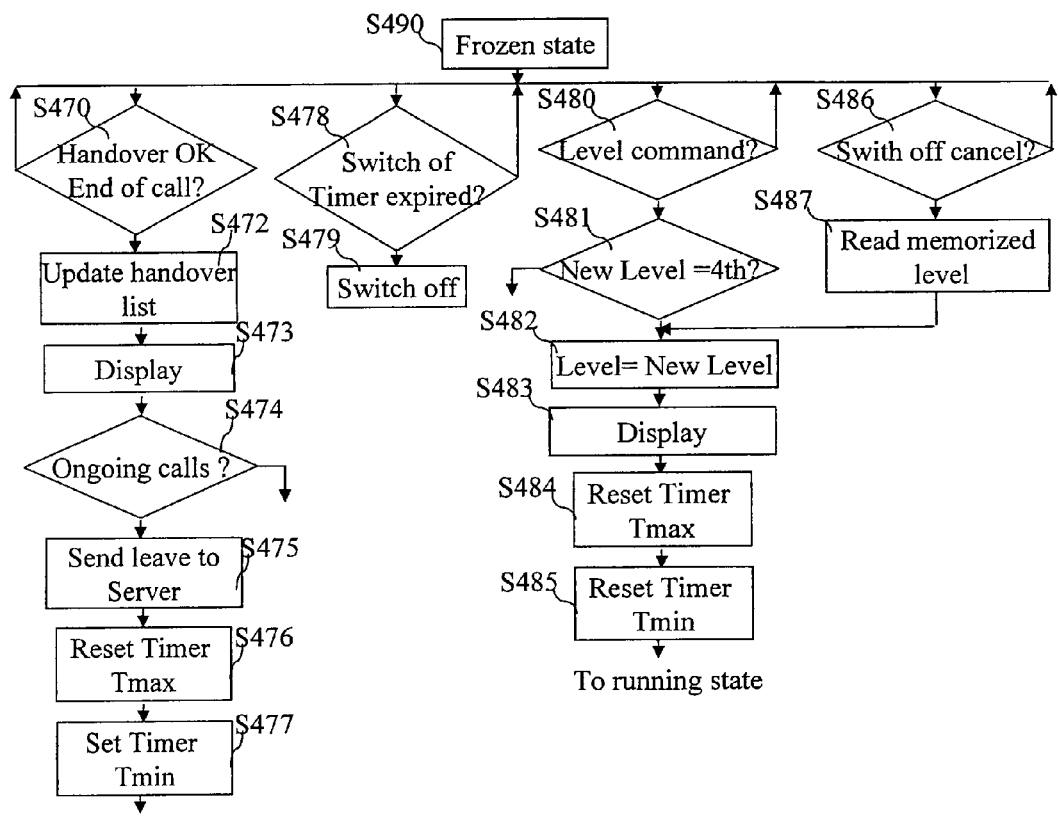

Each base station BTS has, for example, an architecture based on components connected together by a bus 301 and a processor 300 controlled by the programs as disclosed in the FIGS. 4a and 4b.

It has to be noted here that each base station BTS is, in a variant, implemented under the form of one or several dedicated integrated circuits which execute the same operations as the one executed by the processor 300 as disclosed hereinafter.

The bus 301 links the processor 300 to a read only memory ROM 302, a random access memory RAM 303, a network interface 304, a radio interface 305, displaying mean 307 and a keyboard 308.

The memory 303 contains registers intended to receive variables, and the instructions of the programs related to the algorithm as disclosed in the FIGS. 4a and 4b.

The read only memory 302 contains the instructions of the programs implementing the algorithm of the FIGS. 4a and 4b.

The processor 300 controls the operation of the network interface 304 and of the radio interface 305.

The base station BTS is connected to the telecommunication network 50 through the network interface 304. As example, the network interface 304 is a DSL (Digital Subscriber Line) modem, or an ISDN (Integrated Services Digital Network) interface, etc.

The communications established or received by the mobile terminals 30 located in the cell 15 managed by the base station BTS go through the network interface 304 and the radio interface 305.

The displaying mean 307 is a display which informs the partner of different messages generated by the processor 300 as it will described later on. The displaying mean 305 is in a variant composed of LEDs.

The keyboard 308 is constituted of at least one key and enables the partner to enter a level modification command according to the invention or to switch off the base station BTS.

It has to be noted here that, in a variant, the displaying mean 307 and/or the keyboard 308 can be external to the base station BTS. In such case, they are included totally or partially as example, in a personal computer.

FIGS. 4a and 4b represent an algorithm executed by a base station according to the present invention.

The present algorithm is executed by the processor 300 of each base station BTS.

According to the invention, each base station BTS has three states, a running state, a frozen state and a shut down state. The running state corresponds to a state wherein the base station BTS limits the access by the mobile terminals 30 to the wireless telecommunication network according to the class of service determined by the server 10. The frozen state corresponds to a state wherein the base station BTS intends to proceed to handover procedure of the communications currently going through it, prior to be powered off. The shut down state corresponds to a state wherein the base station is powered off.

At step S400 of the FIG. 4a, the processor 300 configures the base station BTS in the running state.

At step S401, the processor 300 checks if a level modification command has been entered through the keyboard 308 by the partner of which the base station BTS belongs to.

If no level modification command has been entered through the keyboard 308, the processor 300 returns to step S400.

If a level modification command has been entered through the keyboard 308, the processor 300 moves to step S402.

At step S402, the processor 300 sets the variable level to the corresponding level modification entered at step S401.

At next step S403, the processor 300 commands the transfer of a message through the network interface 304 informing the server 10 that the variable level has been modified. Preferably, the message comprises the value of the variable level.

At next step S404, the processor 300 commands the displaying of a message on the displaying mean 307 comprising information representing the new value of the variable level.

At next step S405, the processor 300 builds a set of rejected classes according to the value of the variable level.

As example, four different level values can be set.

A first level value authorizes all the calls transferred through the wireless telecommunication network to each mobile terminal 30 located in the cell of the base station BTS or received through the wireless telecommunication network by each mobile terminal 30 located in the cell of the base station BTS.

A second level value authorizes only the calls which have a class of service ranked as a gold or a silver class.

A third level value authorizes only the calls which have a class of service ranked as a gold class.

A fourth level value rejects all the calls transferred through the wireless telecommunication network to each mobile terminal 30 located in the cell of the base station BTS or received through the wireless telecommunication network by each mobile terminal 30 located in the cell of the base station BTS.

At next step S406, the processor 300 forms a list of ongoing calls which have a rejected class of service.

For that, the processor 300 reads in the RAM memory 303, the class of service which is associated to each ongoing call.

At next step S407, the processor 300 checks if the base station BTS stops to transfer, through its radio interface 305 and its network interface 304, all the ongoing calls listed in the list of ongoing calls which have a rejected class.

If the base station BTS stops to transfer all the ongoing calls listed in the list of ongoing calls which have a rejected class of service through its radio interface 305 and its network interface 304, the processor 300 moves to step S413. Otherwise, the processor 300 moves to step S408.

At step S408, the processor 300 selects an ongoing call of the list of ongoing calls and checks if that call is in an handover list.

The handover list comprises all the calls comprised in the list of ongoing calls for which an handover procedure has been started with a neighbour base station BTS in order to transfer the handling of the call to the neighbour base station BTS.

If the call is in the handover list, the processor 300 moves to step S412, otherwise, the processor 300 moves to step S409.

At next step S409, the processor 300 selects the neighbour base station BTS which is susceptible to handle the selected call. For that the processor 300 reads in the RAM memory 303 information related to past measurement reports received from the mobile terminal 30 which is involved in the selected call.

At next step S410, the processor 300 commands the establishment of an handover procedure with the neighbour base station BTS selected at step S409 in order to transfer the handling of the call to the neighbour base station BTS.

At next step S411, the processor 300 registers the selected ongoing call in the handover list.

At next step S412, the processor 300 selects another ongoing call in the list of ongoing calls of rejected classes and returns to step S407.

At step S413, the processor 300 checks if the variable level is equal to the fourth level value. If the variable level is different from the fourth level value, the processor 300 returns to step S400. If the variable level is equal to the fourth level value, the processor 300 moves to step S414. The fourth level value corresponds to the state wherein the base station BTS rejects all the calls transferred through the wireless telecommunication network to each mobile terminal 30 located in the cell of the base station BTS or received through the wireless telecommunication network by each mobile terminal 30 located in the cell of the base station BTS or the fourth level value corresponds to a switch off command.

At step S414, the processor 300 commands the transfer, through the network interface 304, of a leave notification message to each neighbour base station BTS.

A leave notification message informs that the base station BTS intends to stop or to reject all the calls transferred through the wireless telecommunication network to each mobile terminal 30 located in the cell of the base station BTS or received through the wireless telecommunication network by each mobile terminal 30 located in the cell of the base station BTS.

At next step S415, the processor 300 activates a timer noted Tmax.

After that, the processor 300 moves to step S490 of the FIG. 4b which is representative of the frozen state of the base station BTS.

At step S420, the processor 300 checks if a switch off command has been entered through the keyboard 308 by the partner of which the base station BTS belongs to.

If no switch off command has been entered, the processor 300 returns to step S400.

If a switch off command has been entered, the processor 300 moves to step S421.

At step S421, the processor 300 memorizes the value of the variable level in the RAM memory 303.

At next step S422, the processor 300 sets the value of the variable level to the fourth level value, as example to null value.

After that, the processor 300 moves to step S403 already described.

At step S430, the processor 300 checks if a leave or a join notification message is received through the network interface 304 from a neighbour base station BTS.

If a leave or a join notification message is received from a neighbour base station BTS, the processor 300 moves to step S431. Otherwise, the processor 300 returns to step S400.

At step S431, the processor 300 removes or add the identifier of the neighbour base station BTS which sent the message received at step S430 in or from the list of neighbour base stations BTS. The processor 300 also removes cells of the neighbour base station BTS in the lists of neighbour cells of cells of the base station BTS.

After that, the processor 300 returns to step S400.

At step S440, the processor 300 checks if a message representative of a new call establishment for a mobile terminal 30 located in the cell managed by the base station BTS is received or if a message representative of an establishment of an handover procedure is received or if a message comprising a modification of the class of service for one ongoing call is received.

If no message representative of a new call establishment for a mobile terminal 30 located in the cell managed by the base station BTS is received and no message representative of an establishment of an handover procedure is received and no message comprising a modification of the class of service for one ongoing call is received, the processor 300 returns to step 400.

If a message representative of a new call establishment for a mobile terminal 30 located in the cell managed by the base station BTS is received or a message representative of an establishment of an handover procedure is received or a message comprising a modification of the class of service for one ongoing call is received, the processor 300 moves to step S441.

At step S441, the processor 300 commands the transfer of a message, through the network interface 304, requesting the server 10 to transfer in response, a class of service to be associated to the new call or to the call for which the handover procedure is established or to the ongoing call for which the class of service is modified. In a variant of realisation, when the message is representative of an establishment of an handover procedure, the class of service is received from the base station BTS which transferred the message representative of an establishment of an handover procedure.

At next step S442, the processor 300 checks if the class of service associated to the new call establishment or the call for which the handover procedure is established is compatible with the variable level.

If the class of service associated to the new call establishment or the call for which the handover procedure is established is compatible with the value of the variable level, the processor 300 moves to step S444.

If the class of service associated to the new call establishment or the call for which the handover procedure is established is not compatible with the value of the variable level, the processor 300 moves to step S443.

At step S443, the processor 300 rejects the new call or rejects the establishment of the handover procedure. After that, the processor 300 returns to step S400.

At step S444, the processor 300 commands the establishment of the new call through its radio interface 305 and its network interface 304 or proceeds to the handover of the call.

At next step S445, the processor 300 commands the update of the list of mobile terminals which are currently using the base station BTS for ongoing calls and commands at step S446 the display of the list of mobile terminals 30 which are currently using the base station BTS on the displaying mean 307. In a variant of realisation, the number of mobile terminals 30 which are currently using the base station BTS is displayed.

After that, the processor 300 returns to step S400.

At step S450, the processor 300 checks if a message representative of an end of call is received for a mobile terminal 30 located in the cell 15 managed by the base station BTS or if a message representative of an handover procedure completion is received.

If no message representative of an end of call is received for a mobile terminal 30 located in the cell managed by the base station BTS and no message representative of an handover procedure completion is received, the processor 300 returns to step S400.

If a message representative of an end of call is received for a mobile terminal 30 located in the cell managed by the base station BTS or a message representative of an handover procedure completion is received, the processor 300 moves to step S451.

At step S451, the processor 300 removes the call from the handover list and commands at step S452 the display of the handover list on the displaying mean 307. In a variant of realisation, the number of mobile terminals 30 which are currently using the base station BTS is displayed.

After that, the processor 300 returns to step S400.

At step S460, the processor 300 checks if a measurement report is received through the radio interface 305 from a mobile terminal 30 which is located in the cell 15 of the base station BTS.

A measurement report comprises information representative of the signals received by the mobile terminal 30 from the base station BTS and neighbour base stations BTS.

If a measurement report is received, the processor 300 moves to step S461. Otherwise, the processor 300 returns to step S400.

At step S461, the processor 300 checks if an handover procedure has to be triggered for the mobile terminal 30.

If an handover procedure has to be triggered for the mobile terminal 30, the processor 300 moves to step S462. An handover procedure is triggered when the information representative of the signals received by the mobile terminal 30 from the base station BTS is lower than the information representative of the signals received by the mobile terminal 30 from at least one neighbour base station BTS which is included in the list of neighbour base stations BTS.

If no handover procedure has to be triggered for the mobile terminal 30, the processor 300 moves to step S464 and memorises the information representative of the largest signals received by the mobile terminal 30 from a neighbour base station BTS.

After that, the processor 300 returns to step S400.

At step S462, the processor 300 adds the call in the handover list and commands, at step S463, the establishment of an handover procedure with the selected neighbour base station BTS in order to transfer the handling of the call to the neighbour base station BTS.

After that, the processor 300 returns to step S400.

At step S490 of the FIG. 4b, the processor 300 configures the base station BTS in the frozen state.

At step S470, the processor 300 checks, for the mobile terminals 30 identified in the handover list disclosed at step S411, if a message representative of an end of call is received for a mobile terminal 30 located in the cell 15 managed by the base station BTS or if a message representative of an handover procedure completion is received.

If no message representative of an end of call is received for a mobile terminal 30 located in the cell 15 managed by the base station BTS and no message representative of an handover procedure completion is received, the processor 300 returns to step S490.

If a message representative of an end of call is received for a mobile terminal 30 located in the cell 15 managed by the base station BTS or a message representative of an handover procedure completion is received, the processor 300 moves to step S472.

At step S472, the processor 300 removes the call from the handover list and commands at step S473 the display of the handover list on the displaying mean 307. In a variant of realisation, the number of mobile terminals 30 which are currently using the base station BTS is displayed.

At next step S474, the processor 300 checks if there is still one ongoing call which go through the base station BTS.

If there is at least one ongoing call which goes through the base station BTS, the processor 300 returns to step S490.

If no ongoing call is going through the base station BTS, the processor 300 moves to step S475.

At step S475, the processor 300 commands the transfer, through the network interface 304, of a leave notification message to the server 10. The leave notification message informs that the base station BTS rejects any new call establishment or stops to transfer all the calls transferred through the wireless telecommunication network to each mobile terminal 30 located in the cell of the base station BTS or received through the wireless telecommunication network by each mobile terminal 30 located in the cell of the base station BTS.

At next step S476, the processor 300 resets the timer Tmax.

At next step S477, the processor 300 activates a timer noted Tmin.

After that, the processor 300 returns to step S490.

At step S478, the processor 300 checks if the timer Tmin or the timer Tmax is expired or if another switch off command has been entered through the keyboard 308 by the partner of which the base station BTS belongs to.

If the timer Tmin or the timer Tmax is expired or if another switch off command has been entered through the keyboard 308, the processor 300 moves to step S479. Otherwise, the processor 300 returns to step S490.

At step S479, the processor 300 commands the switch off of the power supply of the base station BTS.

At step S480, the processor 300 checks if a level modification command has been entered through the keyboard 308 by the partner of which the base station BTS belongs to.

If no level modification command has been entered through the keyboard 308, the processor 300 returns to step S490.

If a level modification command has been entered through the keyboard 308, the processor 300 moves to step S481.

At next step S481, the processor 300 checks if the new level value is equal to the fourth level value. If the new level value is different from the fourth level value, the processor 300 moves to step S482. If the new level value is equal to the fourth level value, the processor 300 returns to step S490.

At step S482, the processor 300 sets the variable level to the corresponding level modification value entered at step S480 or the value read at step S487 which will be disclosed hereinafter.

At next step S483, the processor 300 commands the display of the handover list on the displaying mean 307. In a variant of realisation, the number of mobile terminals 30 which are currently using the base station BTS is displayed.

At next step S476, the processor 300 resets the timer Tmax.

At next steps S484 and S485, the processor 300 resets the timers Tmin and Tmax.

After that, the processor 300 returns to step S400.

At step S486, the processor 300 checks if a switch off cancellation command has been entered through the keyboard 308 by the partner of which the base station BTS belongs to.

If a switch off cancellation command has been entered through the keyboard 308 by the partner of which the base station BTS belongs to, the processor 300 moves to step S487. Otherwise the processor 300 returns to step S490.

At step S487, the processor 300 reads the value of the variable level in the RAM memory 303 memorized at step S421.

After that, the processor 300 moves to step S482 already described.

FIG. 5 represents an algorithm executed by a server according to the present invention.

At step S500 of the FIG. 5, the processor 500 configures the server 10 in a running state.

At step S501, the processor 200 checks, through the network interface 204, if a message informing that the value of the variable level of a base station BTS has been modified.

If no message informing that the value of the variable level of a base station BTS has been modified, the processor 200 returns to step S500. Otherwise, the processor 200 moves to step S502.

At step S502, the processor 200 memorizes the identifier of the base station BTS which sent the message received at step S501 in combination with the value of the variable level comprised in the received message.

At next step S503, the processor 200 updates the credit for the partner of which the base station BTS belongs to. If the value of the variable level is increased, the credit is increased. If the level is decreased, the credit is decreased. It has to be noted here that a switch off command corresponds to the lowest level value, i.e. the fourth level value which preferably corresponds to null value.

At next step S504, the processor 200 updates the refund policy for the partner of which the base station BTS belongs to. If the level is increased, the refund policy is increased. If the level is decreased, the refund policy is decreased.

At next step S505, the processor 200 updates the billing for the partner of which the base station BTS belongs to. The billing formula is updated for any communication transferred by the base stations BTS which belong to the partner or only for the communications transferred by the base station BTS which sent the message received at step S501. The billing formula is determined according to the class of service of calls of the mobile terminal or terminals of the owner of the base station and/or according the level or levels of acceptance of at least one base station of the owner of the base station BTS.

At next step S506, the processor 200 gets the list of all the ongoing calls for which the mobile terminals of the partner are involved.

At next step S507, the processor 200 checks if all the ongoing calls referenced in the list of ongoing call got at step S506 have been processed.

If all the ongoing calls referenced in the list of ongoing calls got at step S506 have been processed, the processor 200 returns to step S500.

If at least one ongoing call referenced in the list of ongoing calls got at step S506 has not been processed, the processor 200 moves to step S508.

At next step S508, the processor 200 starts the process of an ongoing call in the list of ongoing calls and gets the identifier of the base station BTS which is managing that call.

At next step S509, the processor 200 commands the transfer of a message through the network interface 204 to the base station identified at step S508. The message comprises a modification of the class of service for the ongoing calls under process. If the level received at step S501 is increased, the class of service is increased. If the level received at step S501 is decreased, the class of service is decreased.

At next step S510, the processor 200 selects another ongoing call in the list of ongoing calls and moves to step S507.

At step S520, the processor 200 checks, through the network interface 204, if a message informing that a base station BTS is switched off.

If no message informing that a base station BTS is switched off, the processor 200 returns to step S500. Otherwise, the processor 200 moves to step S521.

At step S521, the processor 200 checks if they are some ongoing calls going through the base station BTS which sent the message received at step S520 which have been interrupted when the base station BTS has been switched off.

If they are some ongoing calls going through the base station BTS which sent the message received at step S520 which have been interrupted when the base station BTS has been switched off, the processor 200 moves to step S522. Otherwise, the processor 200 moves to step S503.

At step S522, the processor 200 memorizes in the database the call details, such as the time of end of communication and the abrupt communication termination cause. An abrupt communication termination is an interruption of an ongoing call without any request from the mobile terminal 30 or the remote telecommunication device involved in the call.

At next step S523, the processor 200 interrupts the billing of the call.

At next step S524, the processor 200 updates the refund policy for the partner of which the base station BTS belongs to.

At next step S525, the processor 200 updates the historic of the partner of which the base station BTS belongs. The historic of a partner memorises a list of calls, and associated class of service, which have been abruptly interrupted due to a switch off of a base station owned by the partner.

At next step S526, the processor 200 selects in the list of ongoing calls another ongoing call which has been interrupted when the base station BTS has been switched off and moves to step S521.

At step S530, the processor 200 checks, through the network interface 204, if a request for a class of service for a call is received from a base station BTS.

If no request for a class of service for a call is received from a base station BTS, the processor returns to step S500. Otherwise, the processor 200 moves to step S531.

At next step S531, the processor 200 determines the class of service of that call.

As example and in a non limitative way, three classes of services are determined. The highest class of service is named the gold class of service, the middle class of service is named the silver class of service and the lowest class of service is named the bronze class of service.

The class of service is determined from multiple parameters. Among parameters which can be used by the processor 200 to derive the class of service, we have:

the call priority. For instance emergency call can be given the highest class of service. Else, different class of service can be given according to the type of service associated to the call, such as video, speech, packet data. Speech service has a higher class of service than the video service and the video service has a higher class of service than the packet service, if the user of the mobile terminal involved in the call is the owner of the base station which is handling the call, the class of service is set as the highest class of service, if the mobile terminal 30 involved in the call is registered as a preferred mobile terminal 30 by the partner of which the base station BTS belongs to, the class of service is set as silver class of service, the subscription level of the mobile terminal 30 to the wireless telecommunication operator, if the user of the mobile terminal 30 involved in the call is a partner, the historic of the base station or stations 30 belonging to the partner if the user of the mobile terminal 30 involved in the call is a partner. The class of service is determined considering if the mobile terminal involved in the call belongs to the owner of the base station which is handling the call and according to the number and/or the class of service of calls abruptly terminated due to at least one power off of the base station and/or according to the number and the class of service of calls abruptly terminated due to at least one power off of at least one different base station, the at least one different base station belonging to the owner of the base station.

the credit of partner, if the user of the mobile terminal 30 involved in the call is a partner. The credit of the partner is determined as disclosed in step S503 from the level of acceptance of calls of at least one base station BTS belonging to the partner.

At step S532, the processor 200 memorizes in the database the call details such as the class of service determined at step S531, the time when the class of service was determined, the identity of the partner who owns the base station, which emitted the request for a class of service.

At next step S533, the processor 200 commands the transfer of the determined class of service for the call to the base station BTS which sent the message received at step S530.

After that, the processor 200 returns to step S500.

At step S540, the processor 200 checks, through the network interface 204, if a message representative of an end of call is received from a base station BTS.

If no message representative of an end of call is received from a base station BTS, the processor 200 returns to step S500. Otherwise, the processor 200 moves to step S541.

At step S541, the processor 200 memorizes in the database the call details such as time of the end of the call.

At next step S542, the processor 200 interrupts the billing of the call.

At next step S543, the processor 200 updates the refund policy for the partner of which the base station BTS belongs to.

After that, the processor 200 returns to step S500.

At step S550, the processor 200 checks, through the network interface 204, if a message representative of the establishment of a new call is received from a base station BTS.

The steps S550 to S554 are in a variant executed instead of the steps S442 to S444.

If no message representative of a call is received from a base station BTS, the processor 200 returns to step S500. Otherwise, the processor 200 moves to step S551.

At step S551, the processor 200 determines the class of service of that call on the same way as the one disclosed at step S531.

At next step S552, the processor 200 checks if the class of service associated to the new call establishment is compatible with the value of the variable level of the base station BTS which send the message received at step S550.

If the class of service associated to the new call establishment or the call for which the handover procedure is established is compatible with the value of the variable level, the processor 200 moves to step S554.

If the class of service associated to the new call establishment or the call for which the handover procedure is established is not compatible with the value of the variable level, the processor 300 moves to step S553 and rejects the incoming call. After that, the processor 200 returns to step S500.

At step S554, the processor 200 memorizes in the database the call details the class of service determined at step S551, the time when the call was started, the identity of the partner who owns the base station BTS, which emitted message representative of the establishment of a new call.

At next step S555, the processor 200 commands the transfer of the determined class of service for the call to the base station BTS which sent the message received at step S530.

After that, the processor 200 returns to step S500.

Naturally, many modifications can be made to the embodiments of the invention described above without departing from the scope of the present invention.

The invention claimed is:

1. A method for determining if a call, corresponding to a mobile terminal located in a cell of a base station of a wireless telecommunication network is to be routed through the base station, the method comprising:
   receiving a command representative of a level of acceptance of calls to be routed through the base station;
   obtaining a class of service associated with the call;
   deciding if the call is to be routed through the base station according to the class of service of the call and the level of acceptance of calls to be routed through the base station, wherein
   the class of service associated with the call indicates whether the mobile terminal involved in the call belongs to a subscriber of the wireless telecommunication network who owns the base station.

2. The method according to claim 1, wherein the method is executed by the base station and the command representative of a level of acceptance is received from an interface associated with the base station.

3. A method according to claim 2, wherein the call is an ongoing call routed through the base station or a new call for the mobile terminal, or is an ongoing call routed through another base station of the wireless telecommunication network and for which a handover procedure is requested in order to permit the ongoing call to be routed through the base station.

4. The method according to claim 3, further comprising:
   establishing a handover procedure with another base station for an ongoing call routed through the base station if a class of service of the ongoing call is not compatible with the level of acceptance of calls to be routed through the base station.

5. A method according to claim 4, wherein the command representative of a level of acceptance of calls to be routed through the base station is a power off command of the base station.

6. The method according to the claim 5, wherein the base station is powered off once a handover has been executed for each ongoing call routed through the base station or after a timer duration.

7. The method of claim 1 wherein the class of service associated with the call is obtained from a server of the wireless telecommunication network.

8. A non-transitory computer-readable medium including computer program instructions, which when executed by the base station, cause the base station to perform the method recited in claim 1.

9. A method for providing information to determine if a call, corresponding to a mobile terminal located in a cell of a base station of a wireless telecommunication network is to be routed through the base station, the method executed by a server of the wireless telecommunication network and comprising:
   determining a class of service associated with the call; and
   transferring the determined class of service associated with the call to the base station, wherein
   the class of service is determined by considering whether the mobile terminal involved in the call belongs to a subscriber of the wireless telecommunication network who owns the base station.

10. The method according to claim 9, wherein the class of service is determined from a call priority and/or according to a type of service associated with the call.

11. The method according to claim 9, wherein the class of service is determined according to a subscription level of the mobile terminal with the wireless telecommunication operator.

12. The method according to claim 9, wherein the class of service is determined by considering whether the mobile terminal involved in the call belongs to the owner of the base station handling the call and according to a number and/or a class of service of calls abruptly terminated due to at least one power off of the base station and/or according to a number and class of service of calls abruptly terminated due to at least one power off of at least one different base station, the at least one different base station belonging to the owner of the base station.

13. The method according to claim 9, wherein the class of service is determined by considering a level of acceptance of calls of at least one base station belonging to the owner of the mobile terminal.

14. The method according to claim 9, wherein the server determines a financial compensation for the base station according to the level of acceptance of calls routed through the base station.

15. A method according to claim 9, wherein the server determines a billing formula for calls of a mobile terminal according to a determined class of service and/or at least one level of acceptance of calls routed through a base station owned by the owner of the mobile terminal.

16. A non-transitory computer-readable medium including computer program instructions, which when executed by the server, cause the server to perform the method recited in claim 9.

17. A base station that determines if a call corresponding to a mobile terminal located in a cell of the base station of a wireless telecommunication network is to be routed through the base station, the base station comprising:
- a user interface configured to receive a command representative of a level of acceptance of calls to be routed through the base station;
- a communication interface configured to obtain a class of service associated with the call;
- a processor configured to decide if the call is to be routed through the base station according to the class of service of the call and the level of acceptance of calls to be routed through the base station, wherein the class of service associated with the call indicates whether the mobile terminal involved in the call belongs to a subscriber of the wireless telecommunication network who owns the base station.

18. A server in a wireless telecommunication network that provides information to determine determination if a call corresponding to a mobile terminal located in a cell of a base station of the wireless telecommunication network is to be routed through the base station, the server comprising:
- a processor configured to determine a class of service associated with the call; and
- a communication interface configured to transfer the determined class of service associated with the call to the base station, wherein the class of service is determined by considering whether the mobile terminal involved in the call belongs to a subscriber of the wireless telecommunication network who owns the base station.

* * * * *